United States Patent [19]

Cartier

[11] 4,115,622

[45] Sep. 19, 1978

[54] ABRASION RESISTANT COATING COMPOSITIONS

[75] Inventor: George E. Cartier, Springfield, Mass.

[73] Assignee: Monsanto Company, St. Louis, Mo.

[21] Appl. No.: 840,204

[22] Filed: Oct. 7, 1977

[51] Int. Cl.$^2$ ............... C09D 3/78; C08K 5/05; B32B 7/02; B32B 17/10
[52] U.S. Cl. ............... 428/409; 260/29.6 F; 260/33.4 F; 260/42.26; 260/42.27; 260/824 R; 260/827; 428/420; 428/422; 428/426; 428/446; 428/451; 428/515; 428/911
[58] Field of Search ............... 260/824 R, 827, 33.4 F, 260/29.6 F, 29.2 M, 42.26, 42.27; 428/426, 420, 422, 409, 446, 451, 500, 515, 911

[56] References Cited

U.S. PATENT DOCUMENTS

| | | | |
|---|---|---|---|
| 3,198,770 | 8/1965 | Watkins | 260/29.6 F |
| 3,390,203 | 6/1968 | Engelhardt | 260/827 |
| 3,429,845 | 2/1969 | Bechtold et al. | 260/827 X |
| 3,429,846 | 2/1969 | Bechtold et al. | 260/827 X |
| 3,476,827 | 11/1969 | Engelhardt | 260/827 X |
| 3,514,425 | 5/1970 | Engelhardt | 260/827 X |
| 3,958,245 | 5/1976 | Cherenko et al. | 428/421 X |
| 3,998,991 | 12/1976 | Kaas | 428/451 X |
| 4,015,057 | 3/1977 | Gall | 260/33.4 F |
| 4,079,160 | 3/1978 | Philipson | 428/515 X |

*Primary Examiner*—Harold Ansher
*Attorney, Agent, or Firm*—D. Bennett; W. J. Farrington; J. C. Logomasini

[57] ABSTRACT

An abrasion resistant coating composition suitable for application to a substrate comprises a polyvinyl acetal resin, a fluorinated alcohol and polysilicic acid.

20 Claims, No Drawings

ABRASION RESISTANT COATING COMPOSITIONS

BACKGROUND OF THE INVENTION

This invention relates to abrasion resistant coatings and specifically to easily scratched substrates with an abrasion resistant coating deposited thereon.

For many purposes artificial polymers have been developed to take the roles traditionally filled by very durable materials such as glass and metal. In many ways the replacements are superior but frequently they have the drawback that they suffer far too readily from abrasion damage. For this reason much work has been done on making the polymers harder and tougher.

There is however, an alternative approach that in some situations is preferred. This comprises the deposition of an abrasion resistant coating on the surface. The present invention falls into this latter category.

One such application which is becoming of increasing significance is in the field of optical laminates, that is transparent sheets comprising at least two layers of different materials and for the sake of clarity and brevity, this application is described in terms of that end use. It is obvious however that the coating compositions described herein can be used on other than laminates and on shaped articles such as bottles. All such uses are to be understood as being within the reasonable purview of this invention.

In certain applications notably in car windshields, optical laminates comprising a thermoplastic sheet material between two sheets of glass are installed as standard equipment in many countries to comply with legislated safety standards. Such laminates have excellent strength and resistance to impact but do tend to be thicker and heavier than is desirable for this application especially when car weights are being cut to improve gas mileage. Moreover, the impact of an object on the surface of the inboard, that is the passenger side, surface of the windshield which is sufficient to splinter the glass layer is usually followed by a sliding downward movement along the fragments of splintered glass. Where the object making the impact is a human head, the resultant lacerations can be extremely unpleasant. It has, therefore, been proposed that the inboard glass layer be replaced by a lighter, thinner thermoplastic material that will not splinter to produce sharp cutting edges on impact.

Suitable replacement materials that have been proposed include polycarbonate, polyethylene terephthalate, polyurethane, cellulose aceto-butyrate, acrylates and styrene and acrylonitrile copolymers. Unfortunately, all of the suitable polymers so far described are much inferior to glass from the point of view of abrasion resistance so that in use the inboard surface is easily damaged by casual contact and even, in some cases, in normal cleaning operations.

One solution to this problem is to provide the inboard layer of thermoplastic material with an abrasion resistant coating. This is a subject that, in its broadest form, i.e., the provision of coatings for easily scratched thermoplastic materials has exercised inventive minds since the mid 1940s.

DISCUSSION OF THE PRIOR ART

U.S. Pat. No. 2,404,357 describes an abrasion resistant coating for polymethylmethacrylate comprising hydrolyzed ethyl silicate with a partially hydrolyzed vinyl acetate polymer in a proportion of 1 part by weight of the hydrolyzed polymer to 1–99 parts by weight of ethyl silicate calculated as $SiO_2$. Another patent describing a polymer coated with a resin-modified polysilicic acid in similar but less restricted terms in U.S. Pat. No. 2,404,426 which was derived from the same parent applications as was U.S. Pat. No. 2,404,357. U.S. Pat. No. 2,440,711 describes a two layer coating comprising a first layer comprising hydrolyzed ethyl silicate and a polyvinyl butyral resin and a second layer comprising a hydrolyzed ethyl silicate and a 20–90 percent hydrolyzed vinyl acetate polymer. More recently, U.S. Pat. No. 3,652,379 describes a polycarbonate resin article with a three layer abrasion resistant coating comprising a first layer of a hydroxylated polycarbonate resin, a second layer consisting essentially of silica and polyvinyl butyral and a third layer consisting essentially of silica and polyvinyl alcohol.

In U.S. Pat. No. 2,440,711 referred to above, the patentee specifically requires a low-hydroxyl polyvinyl butyral in the lower layer of his coating. He states that while relatively high hydroxyl polyvinyl butyrals such as those having up to about 28 percent of the polyvinyl alcohol groups unreacted with butyraldehyde, are useful in the base coat they are not so desirable as the low hydroxy resins such as those having less than about 10 percent of the polyvinyl alcohol groups unreacted because of the higher curing temperatures required to insure the resultant layer is not soluble in the second layer laid on top of it and because of the difficulty of preparing adherent composition with a high hydroxyl content.

It is noted that in U.S. Pat. No. 3,998,991 where a single coating similar to the second layer used in U.S. Pat. No. 2,440,711 is described, a new ingredient in the form of a trimethoxy silane derivative is added to improve flexibility and adhesion to the polymeric substrate.

U.S. Pat. No. 3,476,827 describes a coating composition comprising polysilicic acid, an organic polymer which can be partially hydrolyzed polyvinyl acetal (a 20% hydroxylated polymer is described) or a hydrolyzed copolymer of tetrafluoroethylene and a vinyl ester and a block copolymer of a lower alkylene oxide with dimethyl siloxane (c.f. also U.S. Pat. No. 3,429,846).

The present invention provides an improved coating composition that has shown a greatly improved resistance to abrasion over the coatings of the prior art when applied to a substrate.

DESCRIPTION OF THE INVENTION

This invention comprises a coating composition suitable for application to a substrate which coating composition comprises a polyvinyl acetal resin, a fluorinated acyclic or alicyclic alcohol containing from 4 to 10 carbon atoms and polysilicic acid in which the ratio by weight of polysilicic acid, calculated as $SiO_2$ to resin is from 1:1 to 5:1 and in which the ratio by weight of resin to alcohol is from 1:2 to 15:1.

The invention further comprises a substrate, particularly a laminated glazing unit, provided with a coating having such a composition. A typical laminate of the invention comprises, in laminated sequence, a glass sheet, an intermediate impact-resisting layer, a transparent thermoplastic sheet material and a coating composition comprising a polyvinyl butyral resin having a hydroxyl content, measured as polyvinyl alcohol, of from 35 to 50 percent by weight, a fluorinated alcohol selected from the group consisting of 1H, 1H, 7H dodecafluoro-1-heptanol and 4-perfluoroisopropoxy-3,3,4,4-tetrafluoro-1-butanol, and polysilicic acid, in which the ratio by weight of polysilicic acid, calculated as $SiO_2$, to resin is from 2:1 to 4:1 and in which the ratio by weight of resin to alcohol is from 1:1 to 10:1.

While not wishing to be bound by any theoretical explanation herein set forth, it is believed that when the polyvinyl butyral resin is mixed with the fluorinated alcohol and the polysilicic acid and heated to eliminate water, a reaction occurs between the acid and the hydroxyl groups in the alcohol and the polyvinyl butyral forming a crosslinked reaction product with great coherence and an abrasion resistance approaching that of silica alone. The presence of fluorine in the composition is believed to reduce the coefficient or friction of the coating thereby increasing its resistance to abrasive forces.

THE POLYVINYL ACETAL

The polyvinyl acetal may be prepared by any convenient process but the commercial polymer is conventionally prepared by hydrolyzing a polyvinyl acetate to form a polyvinyl alcohol and then reacting the polyvinyl alcohol with a suitable aldehyde to form a polyvinyl acetal. However, in the absence of particularly stringent precautions neither reaction goes to completion so that a commercial polyvinyl butyral for example may contain up to 3 percent by weight of acetate groups, calculated as polyvinyl acetate, and from about 12 percent to about 25 percent by weight of hydroxyl groups, calculated as polyvinyl alcohol. It is often advantageous to control the process to provide that the alcohol content, calculated on the same basis, be higher than this range for example up to 50 percent particularly from 35 to 50 percent. References to a percent hydroxyl content in what follows is to be understood as referring to a weight percentage of hydroxyl groups, calculated as polyvinyl alcohol, that is present in the polyvinyl acetal polymer.

Any convenient aldehyde such as formaldehyde, propionaldehyde, hexaldehyde, can be used to form the polyvinyl acetal but in practice the preferred aldehyde is butyraldehyde and so the most preferred acetal is polyvinyl butyral.

In general, the polyvinyl butyral resins most frequently employed have Staudinger molecular weights ranging from about 50,000 to 600,000 and preferably from 150,000 to 270,000 and may comprise, on a weight basis, anything from 12 to 50 percent hydroxyl groups, calculated as polyvinyl alcohol. Conventional polyvinyl butyrals usually comprise about 12 to 25 percent hydroxyl groups calculated on this basis but a particularly useful group of polyvinyl butyrals comprise from 35 to 50 percent hydroxyl groups. The balance is conveniently made up from 0 to 3 percent ester groups, (usually acetate groups), calculated as polyvinyl ester, and the rest substantially butyral.

The preferred amount of polyvinyl acetal used in the composition of the present invention is in the ratio of one part by weight for each 1 to 5 parts by weight of polysilicic acid, calculated as $SiO_2$. This is found to be the range that combines greatest adhesion to the substrate with greatest abrasion resistance of the coating formed thereon. Within this range however, from 2 to 4 parts of the polysilicic acid (calculated as above) for every part of the polyvinyl acetal resin is especially preferred.

THE FLUORINATED ALCOHOL

The fluorinated alcohol has a total of from 4 to 10 carbon atoms and may be cyclic or may have a straight or branched carbonation chain. The alcohol may be wholly or partially fluorine-substituted. It is also possible that the alcohol may have other substituents, in addition to fluorine substituents, subject of course to the above limitations on the total carbon atoms in the alcohol. In general, the number of fluorine atoms in the alcohol should exceed the number of hydrogen atoms, preferably by a ratio of at least 2:1. It is preferred however, that the carbon atoms to which the hydroxyl groups is attached should not be fluorinated.

Suitable fluorinated alcohols include 1H-decafluorocyclohexanol, 1H-dodecafluorocyclooctanol, 1H, 1H undecafluoro-1-hexanol; 4-perfluoroisopropoxy 3,3,4,4-tetrafluoro-1-butanol; 1H, 1H, 10H octadecafluoro-1-decanol; and 1H, 1H, 9H-heptadecafluoro-1-nonanol. Of the above alcohols those preferred include those acyclic alcohols having from 6 to 8 and particularly 7 or 8 carbon atoms such as 1H, 1H, 7H dodecafluoro-1-heptanol and 4-perfluoroisopropoxy-3,3,4,4-tetrafluoro-1-butanol.

The amount of fluorinated alcohol that may be used is in the weight ratio to the resin of from 2:1 to 1:15. However, within this range a weight ratio of 1:1 to 1:10 is preferred.

THE POLYSILICIC ACID

The polysilicic acid is conventionally provided by hydrolyzed tetraethyl orthosilicate. In theory, silicic acid comprises molecules formed of silicon atoms surrounded by four hydroxyl radicals but in practice there is invariably a degree of combination or condensation to form a macro-molecule referred to as polysilicic acid. When heated, more condensation occurs with the elimination of water to give a three dimensional silica structure with the majority of the silicon atoms bonded through oxygen atoms to four other silicon atoms. The degree of condensation that occurs can vary widely and for this reason it is convenient to calculate the amount of polysilicic acid on the basis of silica or $SiO_2$. It is understood that no matter what the original organic esterifying group may be, the hydrolysis product is the same.

As was indicated above, when the polysilicic acid reacts with the fluorinated alcohol and the hydroxyl-containing polyvinyl acetal resin in forming a coating on a substrate, the hydroxyl groups of the alcohol and the resin react with the acid to eliminate water and yield a crosslinked coating having a hard coherent structure.

When applied to a substrate, the coating composition of the present invention is conventionally in the form of a solution in a water/organic solvent mixture usually one containing up to 20 percent and preferably about 10 percent by weight of solids. The organic solvent is conveniently an alcohol, particularly methanol, ethanol, propanol, n-butanol, or hexanol, through other water-miscible solvents which are not affected by or react with the acidic ingredients such as acetic acid cyclohexanone or tetrahydrofuran could be used. The preferred solvent is an ethanol/acetic acid mixture.

After application, the composition is usually air dried and then cured by heating at a temperature sufficient to drive off the water eliminated during the condensation reaction. A convenient curing temperature is in the range of 105° to 160° C.

The coating compositions of the invention can be applied to a wide range of substrates such as glass, wood, melamine or phenol/formaldehyde resins, urea/formaldehyde resins, polyvinyl chloride, though it is usually most advantageous to apply it to a thermoplastic resin substrate such as polyvinyl butyral, polyurethanes, polycarbonate, polyethylene, terephthalate, styrene polymers, acrylonitrile polymers, polymethylmethacrylate and cellulose aceto-butyrate.

The coating composition of the invention finds its most useful application in the provision of abrasion resistant coatings for laminated glazing units such as for example car windshields and sunroofs, mirrors and glazing panels for architectural use. It can however, be applied in other fields such as the coating of molded objects such as thermoplastic bottles, trays and other receptacles that are subject to a certain amount of abrasive contact at any stage between fabrication of the molded article and delivery of the receptacle to the customer.

The coating composition is conveniently laid down in the form of a wet layer from 0.025 mm to 0.5 mm and preferably from 0.04 mm to 0.16 mm in thickness though coatings of greater or lesser thicknesses may be appropriate for certain applications. The dry layer thickness can be anything from 2.5 microns upwards though coatings of from 2.5 to 20 and especially 5 to 10 microns are most preferred in practice.

SPECIFIC EMBODIMENTS

Specific examples of coating compositions according to the invention and the utility of such coatings in providing abrasion resistance to a variety of substrates are set out below. Comparison of the compositions of the invention with those of the prior art are also included.

It should be noted that the preparation of optical laminates using coating compositions comprising a hydroxyl-containing polyvinyl butyral is a process that is highly sensitive to the atmospheric dust and water vapor content at the time of preparation. Thus, unless the samples are produced under the same atmospheric conditions, the results obtained are not necessarily comparable.

Where examples comparing the coating compositions according to the invention with those containing polyvinyl butyrals outside the scope of the invention, it may be assumed that they were produced under comparable conditions.

In the following examples the abrasion resistance of the coating specified is tested using a Taber Abraser according to the process set forth in U.S. Standard 26-1 (1966) Test No. 17, Method 7.15 except that the samples are tested after 100, 300, 600 and 1,000 cycles on the Abraser in place of the 100 cycles specified in the above Test. The method of calculating the "Haze" whether initial haze ($H_i$) or the haze after the specified number of cycles ($H_{100}$, $H_{200}$, $H_{600}$ and $H_{1000}$, respectively) is that described in the above test.

PREPARATION OF COATING COMPOSITIONS

A solution containing 15% by weight of polysilicic acid calculated as $SiO_2$ was prepared by hydrolysis of an ethyl silicate solution using ethyl alcohol and hydrochloric acid.

This was mixed with polyvinyl butyral dissolved in ethyl alcohol/acetic acid (in a parts by weight ratio of 54:46) solvent mixture in the amounts necessary to give the desired silica to resin ratio and a total of about 10 percent solids content for the mixture.

The mixture additionally contained a fluorinated alcohol in the amounts specified and, in certain of the Examples, a flow agent.

PREPARATION OF COATED SAMPLES

In each case the coating composition was applied to a substrate film using a 0.076 mm casting blade depositing a wet film of about 0.04–0.05 mm thickness. This is then cured at 150° C. for about 30 minutes.

EXAMPLES

In the following Examples the following abbreviations are used:

15% PVB-A — a 15% solution in EtOH/Ac OH of a polyvinyl butyral comprising about 18% by weight alcohol groups measured as polyvinyl alcohol and about 2–3% by weight acetate groups measured as polyvinyl acetate, the balance being polyvinyl butyral.

10% PVB-B — a 10% solution in EtOH/Ac OH of a polyvinyl butyral similar to PVB-A except that the alcohol content is about 20% by weight measured as polyvinyl alcohol.

15% $SiO_2$ — is understood to refer to a silica sol containing 15% by weight of $SiO_2$.

Alcohol-A — is 4-perfluoroisopropoxy-3,3,4,4-tetrafluorobutanol.

Alcohol-B — is 1$\underline{H}$, 1$\underline{H}$, 7$\underline{H}$ - dodecafluoro-1-heptanol.

Alcohol-C — is 1$\underline{H}$, 1$\underline{H}$, 11$\underline{H}$, - eicosafluoro-1-undecanol.

EtOH/Ac OH — an ethyl alcohol/acetic acid mixture in a parts by weight ratio of 54:46.

% F — is percentage of fluorine by weight in the coating composition after elimination of solvents.

%OH — is the total percentage of hydroxyl groups by weight in the coating composition derived from both the fluorinated alcohol and the polyvinyl butyral (measured as —OH groups only).

X-4347 — is a flow agent comprising an alkylene oxide/dimethyl siloxane copolymer available from Union Carbide under that designation.

PET — an optical grade polyethylene terephthalate film.

EXAMPLES I–IV

These Examples describe the formulation of four coating compositions according to the invention. The method used to prepare the compositions was that described above.

TABLE I

|  | Ex. I | Ex. II | Ex. III | Ex. IV |
| --- | --- | --- | --- | --- |
| 15% $SiO_2$ | 166g | 166g | 233g | 233g |
| 15% PVB-A | 60g | 53.3g | 60g | 53.3g |
| EtOH/Ac OH | 123g | 129g | 156g | 162g |
| Alcohol-A | 1g | 2g | 1g | 2g |
| Total Solids | 10% | 10% | 10% | 10% |
| % OH | 11.8 | 10.3 | 11.8 | 10.3 |
| % F | 6.3 | 12.6 | 6.3 | 12.6 |
| Ratio $SiO_2$/PVB-A | 2.5:1 | 2.5:1 | 3.5:1 | 3.5:1 |
| Ratio PVB-A/Alcohol-A | 9:1 | 4:1 | 9:1 | 4:1 |

The above formulations were coated on PET substrates and tested for abrasion resistance by the method described above. A series of tests were performed on each composition and each series comprised four samples. The results set forth in Table 2 are the average haze obtained on the four samples after the cycles on the Taber Abraser indicated.

TABLE 2

|  | $H_I$ | $H_{100}$ | $H_{300}$ | $H_{600}$ | $H_{1000}$ |
|---|---|---|---|---|---|
| Example I | 1.11 | 4.03 | 5.6 | 6.89 | 6.20 |
| Example II | 1.29 | 2.54 | 3.66 | 4.60 | 5.40 |
| Example III | 1.48 | 2.52 | 3.26 | 3.80 | 4.66 |
| Example IV | 1.23 | 2.34 | 2.75 | 3.40 | 3.91 |

From the above series of tests (comprising I with II, and III with IV) it can be seen that increasing the amount of fluorinated alcohol in the composition has a marked effect on haze development. It can also be seen that a higher silica to resin ratio (compare III with I and IV with II) is also effective in reducing haze development during abrasion.

EXAMPLES V–XII

In this series of Examples the effect of adding a flow agent (X-4347) on the abrasion resistance is investigated. 50 Gram samples of the compositions of Examples I–IV were formulated with 0.0025g and with 0.025g of X-4347 and were coated upon PET film and abrasion tested as before. Once again the figures given are the average of the haze values for four samples.

TABLE 3

|  | $H_I$ | $H_{100}$ | $H_{300}$ | $H_{600}$ | $H_{1000}$ |
|---|---|---|---|---|---|
| Example V | 1.69 | 2.67 | 3.88 | 4.52 | 4.88 |
| Example VI | 1.56 | 3.08 | 4.63 | 5.86 | 5.77 |
| Example VII | 1.55 | 2.28 | 3.06 | 4.03 | 4.32 |
| Example VIII | 1.82 | 2.62 | 3.23 | 4.59 | 4.37 |
| Example IX | 1.62 | 2.58 | 3.36 | 4.92 | 5.83 |
| Example X | 1.42 | 2.42 | 2.64 | 3.77 | 4.54 |
| Example XI | 1.66 | 2.34 | 2.89 | 3.83 | 6.14* |
| Example XII | 1.53 | 2.51 | 3.43 | 4.91* | 5.37* |

*Some samples developed surface defects giving unrealistically high haze values.

The compositions used in Examples V to XII were related to Examples I–IV as follows:

| 50g of comp. of gm. of X-4347 | EX-AMPLE I 0.0025 0.025 | EX-AMPLE II 0.0025 0.025 | EX-AMPLE III 0.0025 0.025 | EX-AMPLE IV 0.0025 0.025 |
|---|---|---|---|---|
| Examples | V VI | VII VIII | IX X | XI XII |

These Examples show that the use of a flow agent does not materially worsen the abrasion resistance and that even increasing the amount used tenfold likewise has only a marginal effect.

EXAMPLES XIII–XVI

In the following Examples a 10 percent solution of PVB-B in an EtOH/Ac OH solvent was mixed with a 15 percent SiO₂ solution, a fluorinated alcohol, (Alcohol B or C) and enough EtOH/Ac OH to give a formulation with 10 percent by weight of solids.

Using the method previously described, each formulation was used to produce a 0.04–0.05 mm coating on a PET film which was used and tested for abrasion resistance. As before each result given is the average of those obtained with four samples.

TABLE 4

|  | Ex. XIII | Ex. XIV | Ex. XV | Ex. XVI |
|---|---|---|---|---|
| 15% SiO₂ | 20 | 22 | 28 | 22 |
| 10% PVB-B | 10 | 10 | 10 | 10 |
| EtOH/Ac OH | 10 | 12.3 | 17.6 | 12.3 |
| Alcohol B | — | 0.1 | 0.4 | — |
| Alcohol C | — | — | — | 0.1 |
| % OH | 7.2 | 7.0 | 8.4 | 6.8 |
| % F | 0 | 6.2 | 19.6 | 6.8 |
| Ratio SiO₂:PVB-B | 3:1 | 3.3:1 | 4.2:1 | 3.3:1 |
| Ratio PVB-B: Alcohol | — | 10:1 | 2.5:1 | 10:1 |

The haze results obtained with Examples XIII–XVI are set forth below in Table 5.

TABLE 5

|  | $H_I$ | $H_{100}$ | $H_{300}$ | $H_{600}$ | $H_{1000}$ |
|---|---|---|---|---|---|
| Example XIII | 0.91 | 2.43 | 4.26 | 6.97 | 7.12 |
| Example XIV | 0.96 | 2.37 | 3.74 | 6.03 | 5.80 |
| Example XV | 0.80 | 2.11 | 2.72 | 4.51 | 4.66 |
| Example XVI | 1.20 | 2.92 | 4.34 | 7.29 | 7.14 |

From the above it can be seen that the Alcohol B performs substantially better than Alcohol C (11 carbon atoms) and the formulation without an alcohol component in reducing haze formation.

EXAMPLES XVII and XVIII

These examples show in Table 6, a control (without a fluorinated alcohol) and a composition according to the invention and the abrasion resistance of both.

TABLE 6

| Formulation | Example XVI | Example XVIII |
|---|---|---|
| 15% SiO₂ | 20 g | 40 g |
| 10% PVB-B | 10 g | 10 g |
| EtOH/Ac OH | 10 g | 29 g |
| Alcohol B | — | 1 g |
| Ratio SiO₂:PVB-B | 3:1 | 6:1 |
| Ratio PVB-B:Alcohol B | — | 1:1 |
| % OH | — | 6:1 |
| % F | — | 34.5 |
| Haze |  |  |
| $H_I$ | 1.07 | 1.05 |
| $H_{100}$ | 2.57 | 2.29 |
| $H_{300}$ | 4.12 | 3.37 |
| $H_{600}$ | 5.03 | 3.97 |
| $H_{1000}$ | 4.83 | 3.60 |

These results show the good abrasion resistance of compositions according to the invention even after protracted abrasion testing.

The present invention also contemplates the use of conventional additives in the coating composition of the invention. These include adhesion promoters, flow agents, dyes, U.V. stabilizers, pigments, antioxidants and the like. It is evident from the foregoing that many changes and modifications can be made without departing from the essential spirit and scope of the present invention.

What is claimed is:

1. A coating composition suitable for application to a substrate which coating composition comprises a polyvinyl acetal resin, a fluorinated aliphatic alcohol containing from 4 to 10 carbon atoms and polysilicic acid, in which the ratio by weight of polysilicic acid, calculated as $SiO_2$, to resin is from 1:1 to 5:1 and in which the ratio by weight of resin to alcohol is from 1:2 to 15:1.

2. The coating composition of claim 1 in which the fluorinated alcohol contains from 6 to 8 carbon atoms.

3. The coating composition of claim 1 in which the fluorinated alcohol comprises at least twice as many fluorine atoms as hydrogen atoms.

4. The coating composition of claim 1 in which the fluorinated alcohol is selected from the group consisting of 1H, 1H, 7H, dodecafluoro-1-heptanol and 4-perfluoroisopropoxy-3,3,4,4-tetrafluoro-1-butanol.

5. The coating composition of claim 1 in which the polyvinyl acetal is polyvinyl butyral.

6. The coating composition of claim 1 in which the $SiO_2$ to resin weight ratio is from 2:1 to 4:1.

7. The coating composition of claim 1 in which the resin to alcohol weight ratio is from 1:1 to 10:1.

8. The coating composition of claim 1 in which the polyvinyl acetal is a polyvinyl butyral having an hydroxyl content, calculated as polyvinyl alcohol, of from 35 to 50 percent by weight.

9. A coating composition suitable for application to a substrate which coating composition comprises a polyvinyl butyral resin, a fluorinated alcohol, having from 6 to 8 carbon atoms and polysilicic acid, in which the ratio by weight of polysilicic acid, calculated at $SiO_2$, to resin is from 2:1 to 4:1 and in which the ratio by weight of resin to alcohol is from 1:1 to 10:1.

10. The coating composition of claim 9 in which the fluorinated alcohol contains at least twice as many fluorine atoms as hydrogen atoms and in which the carbon atom bearing the hydroxyl group is not bonded directly to any fluorine atom.

11. A coating composition suitable for application to a substrate which coating composition comprises a polyvinyl butyral resin having a hydroxyl content, measured as polyvinyl alcohol, of from 35 to 50 percent by weight, a fluorinated alcohol selected from the group consisting of 1H, 1H, 7H dodecafluoro-1-heptanol and 4-perfluoroisopropoxyl-3,3,4,4-tetrafluoro-1-butanol, and polysilicic acid, in which the ratio by weight of polysilicic acid, calculated as $SiO_2$, to resin is from 2:1 to 4:1 and in which the ratio by weight of resin to alcohol is from 1:1 to 10:1.

12. A substrate coated with a coating composition according to claim 1.

13. A substrate coated with a coating composition according to claim 9.

14. A sheet of a transparent thermoplastic material coated with a coating composition comprising a polyvinyl acetal resin, a fluorinated aliphatic alcohol containing from 4 to 10 carbon atoms and polysilicic acid, in which the ratio by weight of polysilicic acid, calculated as $SiO_2$, to resin is from 1:1 to 5:1 and in which the ratio by weight of resin to alcohol is from 1:2 to 15:1.

15. A sheet of a transparent thermoplastic material coated with a coating composition comprising a polyvinyl butyral resin, a fluorinated alcohol selected from group consisting of 1H, 1H, 7H dodecafluoro-1-heptanol and 4-perfluoroisopropoxy-3,3,4,4-tetrafluoro-1-butanol, and polysilicic acid, in which the ratio by weight of polysilicic acid, calculated as $SiO_2$, to resin is from 2:1 to 4:1 and in which the ratio by weight of resin to alcohol is from 1:1 to 10:1.

16. A coated sheet according to claim 15 in which the polyvinyl butyral has an hydroxyl content, measured as polyvinyl alcohol, of from 35 to 50 percent by weight.

17. A coated sheet according to claim 14 in which the transparent thermoplastic material is selected from the group consisting of polycarbonate, polyester, polyacrylates, acrylonitrile polymers and cellulosic esters.

18. A laminate comprising a coated sheet according to claim 14.

19. A laminate comprising a coated sheet according to claim 15.

20. A laminate comprising in laminated sequence a glass sheet, an intermediate impact-resisting layer, a transparent thermoplastic sheet material and a coating composition comprising a polyvinyl butyral resin having a hydroxyl content, measured as polyvinyl alcohol, of from 35 to 50 percent by weight, a fluorinated alcohol selected from the group consisting of 1H, 1H, 7H dodecafluoro-1-heptanol and 4-perfluoroisopropoxy-3,3,4,4-tetrafluoro-1-butanol, and polysilicic acid, in which the ratio by weight of polysilicic acid, calculated as $SiO_2$, to resin is from 2:1 to 4:1 and in which the ratio by weight of resin to alcohol is from 1:1 to 10:1.

* * * * *